US012665813B2

(12) United States Patent
Molina et al.

(10) Patent No.: US 12,665,813 B2
(45) Date of Patent: Jun. 23, 2026

(54) OPERATING A NETWORK NODE

(71) Applicant: Analog Devices International Unlimited Company, Limerick (IE)

(72) Inventors: Isaac Molina, Valencia (ES); Hector Barreras Almarcha, Valencia (ES)

(73) Assignee: Analog Devices International Unlimited Company, Limerick (IE)

( * ) Notice: Subject to any disclaimer, the term of this patent is extended or adjusted under 35 U.S.C. 154(b) by 116 days.

(21) Appl. No.: 18/657,615

(22) Filed: May 7, 2024

(65) Prior Publication Data

US 2024/0380668 A1     Nov. 14, 2024

Related U.S. Application Data

(60) Provisional application No. 63/500,856, filed on May 8, 2023.

(51) Int. Cl.
*G06F 15/173* (2006.01)
*H04L 41/0806* (2022.01)
*H04L 41/12* (2022.01)

(52) U.S. Cl.
CPC .......... *H04L 41/12* (2013.01); *H04L 41/0806* (2013.01)

(58) Field of Classification Search
CPC .................. H04L 41/12; H04L 41/0806; H04L 2012/40273; H04L 12/40195; G05B 2219/2637; G05B 19/0426
See application file for complete search history.

(56) References Cited

U.S. PATENT DOCUMENTS

| | | | | |
|---|---|---|---|---|
| 2006/0153179 A1* | 7/2006 | Ho | ........................... | H04L 49/35 |
| | | | | 370/386 |
| 2014/0143839 A1* | 5/2014 | Ricci | ................ | H04N 21/41422 |
| | | | | 726/4 |
| 2016/0046130 A1* | 2/2016 | Burdge | .................... | B41J 2/175 |
| | | | | 29/714 |
| 2016/0353238 A1* | 12/2016 | Gherardi | ................. | G01S 1/042 |
| 2017/0223801 A1* | 8/2017 | Gan | ..................... | G06F 3/04817 |
| 2018/0348754 A1 | 12/2018 | Samii et al. | | |
| 2022/0126846 A1 | 4/2022 | Maekawa | | |

FOREIGN PATENT DOCUMENTS

CN          115348298 A          11/2022

OTHER PUBLICATIONS

Extended European Search Report issued in corresponding European Application No. 24 17 4902 dated Sep. 20, 2024.

* cited by examiner

*Primary Examiner* — John B Walsh

(74) *Attorney, Agent, or Firm* — ArentFox Schiff LLP

(57) ABSTRACT

A method is provided for operating a network node in a multi-node network having one or more Master Control Units (MCUs) configured to control network nodes when the one or more MCUs are available. The aspects include, in one or more memory regions of the network node having a header and a payload: storing one or more conditions in the header, storing one or more commands in the payload associated with the one or more conditions, and configuring at least one of the one or more conditions to comprise using a time base of the network node, the time base including a starting timestamp and a programmable period time T. The aspects further include, in a control device of the network node: determining, according to the time base, whether a condition stored in a header of a selected region occurs, and performing a node control action based on the determining.

21 Claims, 10 Drawing Sheets

300

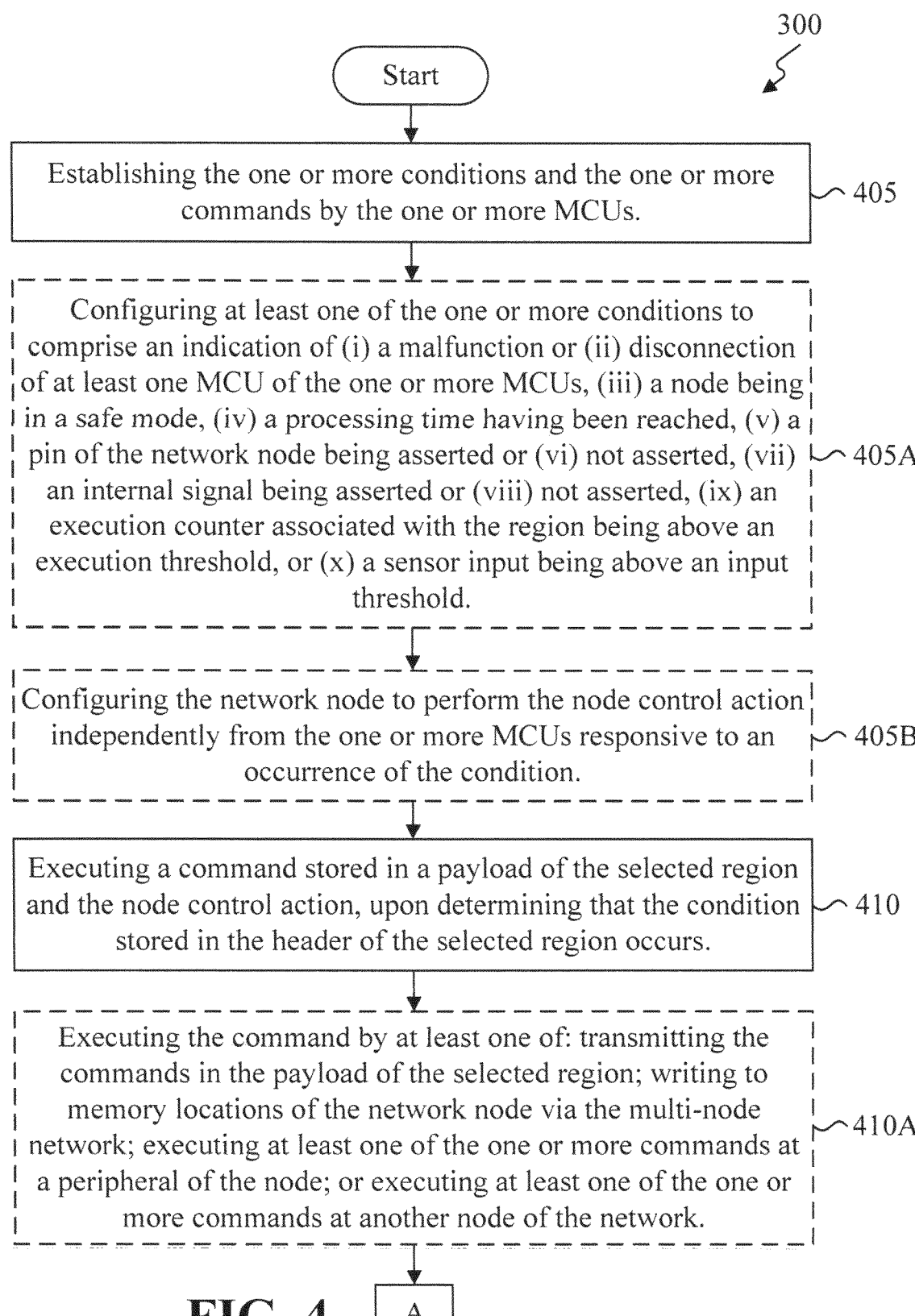

Start

Establishing the one or more conditions and the one or more commands by the one or more MCUs.          ᔈ 405

Configuring at least one of the one or more conditions to comprise an indication of (i) a malfunction or (ii) disconnection of at least one MCU of the one or more MCUs, (iii) a node being in a safe mode, (iv) a processing time having been reached, (v) a pin of the network node being asserted or (vi) not asserted, (vii) an internal signal being asserted or (viii) not asserted, (ix) an execution counter associated with the region being above an execution threshold, or (x) a sensor input being above an input threshold.          ᔈ 405A Configuring the network node to perform the node control action independently from the one or more MCUs responsive to an occurrence of the condition.          ᔈ 405B Executing a command stored in a payload of the selected region and the node control action, upon determining that the condition stored in the header of the selected region occurs.          ᔈ 410

Executing the command by at least one of: transmitting the commands in the payload of the selected region; writing to memory locations of the network node via the multi-node network; executing at least one of the one or more commands at a peripheral of the node; or executing at least one of the one or more commands at another node of the network.          ᔈ 410A

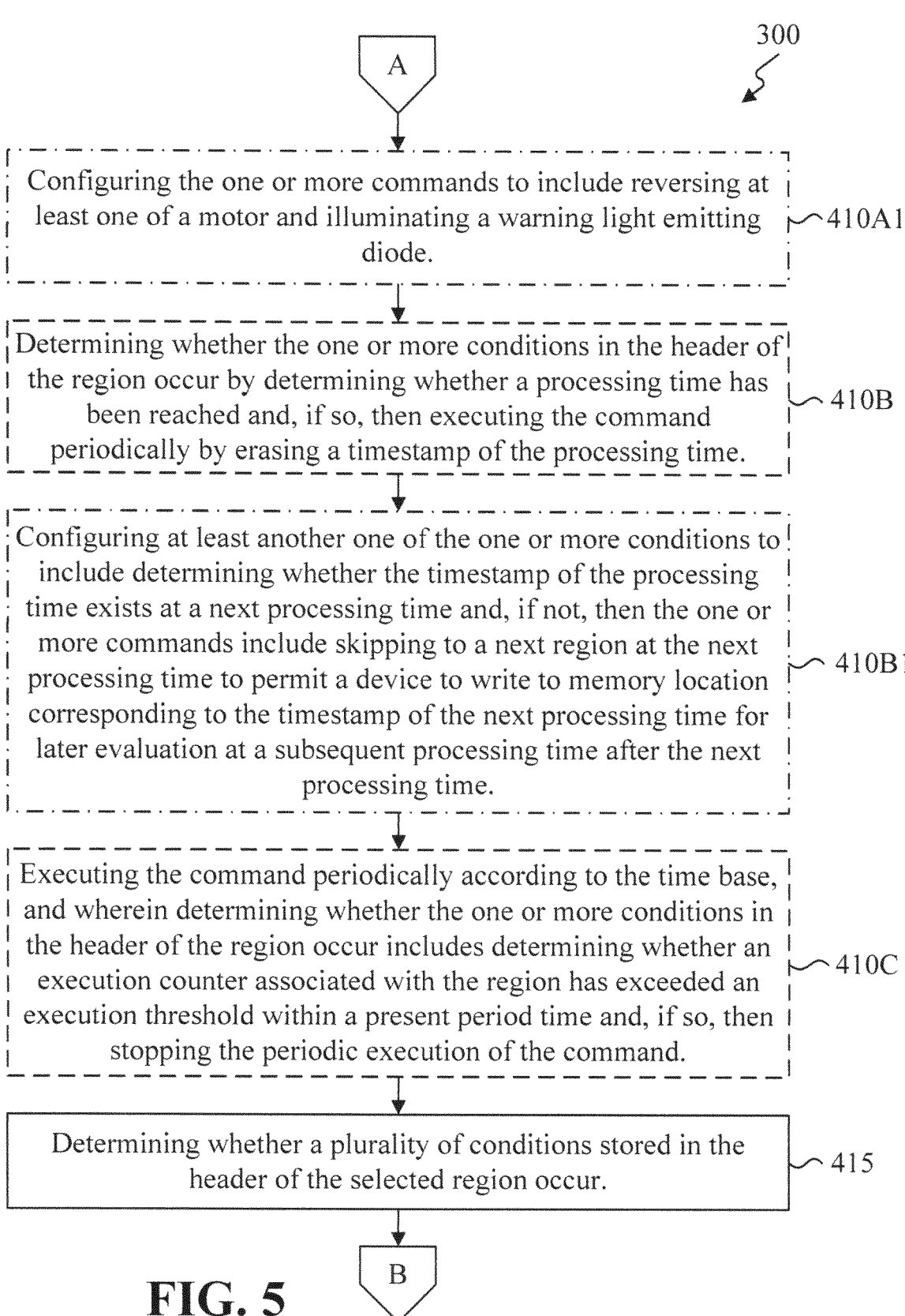

300

A

Configuring the one or more commands to include reversing at least one of a motor and illuminating a warning light emitting diode. ∽410A1

Determining whether the one or more conditions in the header of the region occur by determining whether a processing time has been reached and, if so, then executing the command periodically by erasing a timestamp of the processing time. ∽410B Configuring at least another one of the one or more conditions to include determining whether the timestamp of the processing time exists at a next processing time and, if not, then the one or more commands include skipping to a next region at the next processing time to permit a device to write to memory location corresponding to the timestamp of the next processing time for later evaluation at a subsequent processing time after the next processing time. ∽410B1

Executing the command periodically according to the time base, and wherein determining whether the one or more conditions in the header of the region occur includes determining whether an execution counter associated with the region has exceeded an execution threshold within a present period time and, if so, then stopping the periodic execution of the command. ∽410C Determining whether a plurality of conditions stored in the header of the selected region occur. ∽415

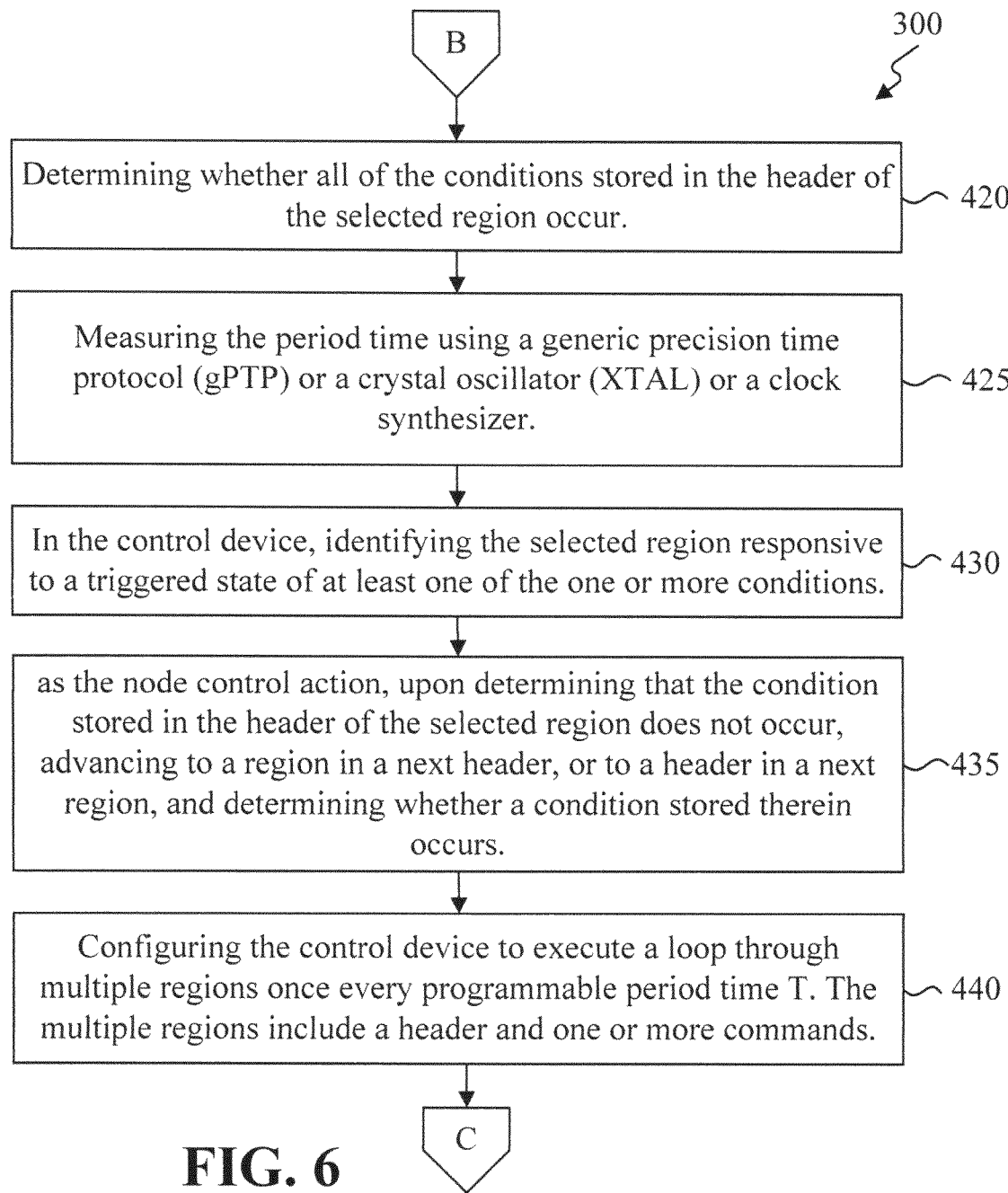

300

B

Determining whether all of the conditions stored in the header of the selected region occur. ⟜ 420

Measuring the period time using a generic precision time protocol (gPTP) or a crystal oscillator (XTAL) or a clock synthesizer. ⟜ 425

In the control device, identifying the selected region responsive to a triggered state of at least one of the one or more conditions. ⟜ 430 as the node control action, upon determining that the condition stored in the header of the selected region does not occur, advancing to a region in a next header, or to a header in a next region, and determining whether a condition stored therein occurs. ⟜ 435

Configuring the control device to execute a loop through multiple regions once every programmable period time T. The multiple regions include a header and one or more commands. ⟜ 440

OPERATING A NETWORK NODE

CLAIM OF PRIORITY

The present application claims priority to U.S. Provisional Application No. 63/500,856, filed on May 8, 2023, and hereby incorporated herein by reference.

BACKGROUND

This disclosure relates generally to networks, more particularly, to operating a network node without involvement of a master control unit (MCU).

Automotive Ethernet connectivity is an enabler of new, zonal architectures in automotive design and supports automotive megatrends like personalization, autonomy, and electrification. Ethernet has become the ubiquitous technology for backbone network connectivity across many industries, and it is proving to be a critical technology in the automotive world as well.

Ethernet to the Edge Bus ($E^2B$) is a protocol for enhancing new architectures in that $E^2B$ removes the need for protocol translation to legacy networks. $E^2B$ centralizes software by moving software from edge nodes to central processing units, reducing software development and qualification tasks. $E^2B$ reduces system complexity in that a full hardware implementation of edge nodes simplifies design. Maintaining Ethernet all the way to the edge nodes provides a fully optimized Ethernet architecture utilizing time sensitive networking (TSN) to deliver quality of service and flexible address-based routing for dynamic network creation. The broad physical layer portfolio enables solutions for practically any situation. $E^2B$ has many other attendant advantages.

However, conventional Ethernet networks are configured to have a MCU control functions of the network nodes. This can be disadvantageous when the MCU is down and/or otherwise unavailable.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

According to aspects of the present disclosure, a computer-implemented method is provided for operating a network node in a multi-node network having one or more Master Control Units (MCUs) configured to control network nodes of the multi-node network when the one or more MCUs are available. The method includes, in one or more memory regions of the network node having a header and a payload: storing one or more conditions in the header, storing one or more commands in the payload associated with the one or more conditions, and configuring at least one of the one or more conditions to include using a time base of the network node. The time base includes a starting timestamp and a programmable period time T. The method further includes, in a control device of the network node: determining, according to the time base, whether a condition stored in a header of a selected region occurs, and performing a node control action based on the determining.

According to other aspects, a network node is provided in a multi-node network having one or more Master Control Units (MCUs) configured to control network nodes of the multi-node network when the one or more MCUs are available. The network node includes one or more memories, individually or in combination, configured to store instructions, headers and payloads in at least one of one or more memory regions. The network node further includes one or more control devices, each coupled to at least one of the one or more memories, configured to execute the instructions to, in the one or more memory regions of the network node having a header and a payload: store one or more conditions in the header, store one or more commands in the payload associated with the one or more conditions, and configure at least one of the one or more conditions to include using a time base of the network node. The time base includes a starting timestamp and a programmable period time T. The one or more control devices are further configured to: determine, according to the time base, whether a condition stored in a header of a selected region occurs, and perform a node control action based on the determining.

According to further aspects, a computer program product is provided for operating a network node in a multi-node network having one or more Master Control Units (MCUs) configured to control network nodes of the multi-node network when the one or more MCUs are available. The computer program product is configured to simulate various functions of a remote network node, and includes one or more non-transitory computer-readable media, having instructions stored thereon that when executed by one or more processors cause the one or more processors, individually or in combination, to perform a method. The method includes, in one or more memory regions of the network node having a header and a payload: storing one or more conditions in the header, storing one or more commands in the payload associated with the one or more conditions, and configuring at least one of the one or more conditions to include using a time base of the network node. The time base includes a starting timestamp and a programmable period time T. The method also includes, in a control device of the network node: determining, according to the time base, whether a condition stored in a header of a selected region occurs, and performing a node control action based on the determining.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIGS. 4-7 are flow diagrams of further steps of the method of FIG. 3, in accordance with an example aspect.

DETAILED DESCRIPTION

Figure 1:
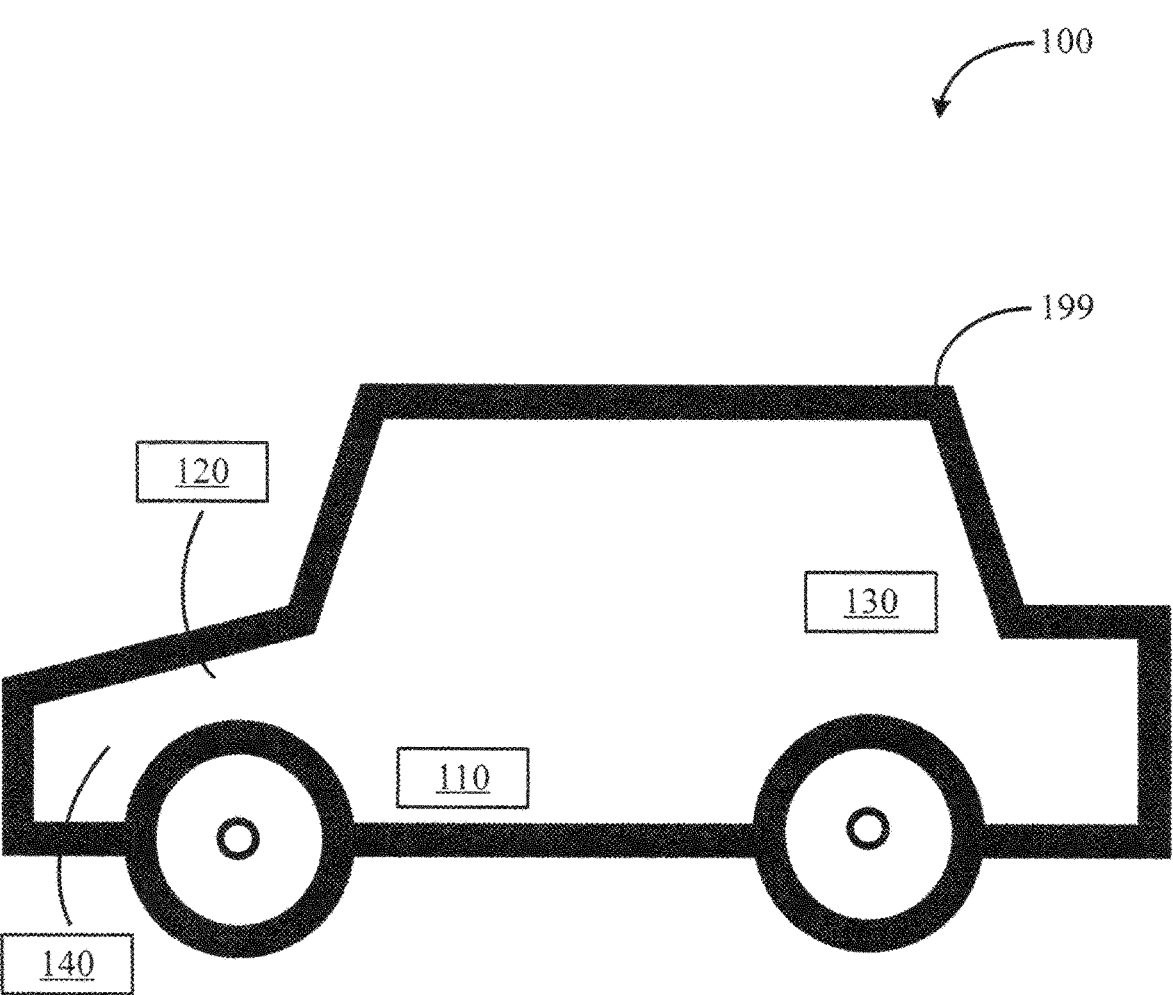
FIG. 1 is a block diagram of an example communication system having a Master Control Unit (MCU) and a set of remote network nodes, in accordance with an example aspect.

Aspects of the present disclosure are directed to a network node configured to operate in a multi-node network without master control unit (MCU) intervention. For example, the network node is configured to act autonomously when the MCU is unavailable. The network node is a hardware-based implementation of one or more processors and one or more memories that processes incoming communication traffic to distinguish between situations that require network node action in the absence of MCU intervention. In another aspect, the network node may be a hardware-based implementation of one or more microcontrollers. In yet another aspect, the network node may be a hardware-based implementation of one or more logic devices (programmable logic arrays (PLAs)). In still another aspect, the network node may be a hardware-based implementation of one or more state machines. These and other types of control devices for a network of remote nodes may be used in accordance with the teachings of the present disclosure.

As used herein, the term "in the absence of MCU intervention" and similar terms refer to the lack of participation of the MCU in a sequence of actions by the network node including detecting a situation when the MCU is unavailable and acting responsive to a given stimulus (one or more sensor outputs). The term "acting responsible to a given stimulus" can involve the network node controlling one or more subsystems (e.g., steering, braking, lighting, stability, windows, doors, etc.) in a system (e.g., a car) in which the multi-node network is deployed.

Aspects of the present disclosure are directed to the communication of Protocol Data Units (PDUs). A PDU can be, for example, a packet or a frame. A packet is the PDU at layer 3 (network layer-IP packet) of the networking OSI model. A frame is the PDU of layer 2 (data link) of the OSI model. For the sake of illustration, further description of various aspects of the present disclosure will refer to frames, but can readily be applied to any PDU based on the teachings provided herein.

As noted above, a network node using the Ethernet protocol might be subject to an unavailable master control unit (MCU). One example type of Ethernet networking technology is 10BASE-TIS, in which twisted-pair cables are used for the physical layer communications. 10BASE-TIS is designed for use in automotive and industrial environments where high levels of noise and electromagnetic interference may be present. Ethernet to the Edge Bus (E²B) is an Ethernet protocol, such as for use in a 10BASE-TIS network, which removes the need for a Master Control Unit (MCU) in the edge node. The present disclosure provides apparatus, methods, and computer-readable media that provide Ethernet communications, such as in an E²B Ethernet implementation, with a robust communication flow between a Master Control Unit (MCU) and a network node, as well as enabling detection of unavailability of the MCU and corresponding autonomously taken actions by the network node in response to the unavailability of the MCU.

In other aspects, tasks can be offloaded to remote network nodes for subsequent performance, where a task represents monitoring for the occurrence of a set of one or more conditions and performing and causing the performance of certain commands in response to the detection of the occurrence of the set of conditions. Thus, even if an MCU is available, it may not monitor or may use a different monitoring frequency than a local monitor on the remote node. For example, the local monitor may have a finer granularity than any concurrent monitoring performed by an MCU. In this way, a quicker reaction speed to perform a given task is realized by a reduction in signal travel length from an MCU to a remote node that may then possibly have to interact with one or more other nodes, e.g., corresponding to one or more subsystems of a system that can include a vehicle, a robot, a manufacturing device (chip), toy, and so forth.

It should be noted that while various aspects of the present disclosure are described primarily with respect to E²B protocol, the present disclosure is not limited to solely E²B protocol and may be used with other Ethernet protocols. Similarly, while one or more aspects of the present disclosure may be described with respect to an automotive application, other applications as described herein and envisioned by one of ordinary skill in the art given the teachings of the present disclosure provided herein may also be used. For example, in another aspect, the present disclosure may be applied to robots in a warehouse or manufacturing environment, and so forth. In yet another aspect, the present disclosure may be applied to an environmental system having one or more settings (conditions) and one or more corresponding commands (fan speed, temperature, etc.) to enable those conditions. In an aspect, a set of conditions may correspond to a particular device and its operating parameters (e.g., for a fan, the fan speed, for a light, the brightness assuming adjustability (dimmer function)).

In various aspects, an acknowledgement engine of, e.g., E²B technology network, ensures a reliable communication flow between a MCU and a network node during "normal" times. Otherwise, the network node performs an autonomous set of actions without MCU intervention responsive to a given set of stimuli during "abnormal" times, that is, times when the MCU is unavailable. Decisions are made by the network node and acted upon accordingly by the network node in response to detecting an unavailable MCU. Such MCU unavailability may be due to any number of causes including an MCU failure itself or unavailability due to a (detectable) condition such as rebooting or a failure of the communication channel between the MCU and the network node.

In an aspect, action assignments for network nodes in a multi-node network can be made by the MCU during normal times, that is, when the MCU is available to communicate with the network nodes, by sending information relating to one or more conditions and one or more commands corresponding to the one or more conditions. In an aspect, "normal" time can be determined across multiple network nodes such as all nodes or a subset of network nodes greater than one or may be determined individually per node. In an aspect, network nodes may be "loaded" (filled) with information (conditions and commands) during any of the preceding types of "normal" time depending upon the implementation.

In an aspect, the one or more conditions and the one or more commands may be stored in any of the header and/or payload of a same PDU or consecutive PDUs.

The conditions represent various scenarios that exist and/or otherwise occur. The conditions may be evaluated, for example, continuously or according to a schedule or some periodicity in order to determine whether the one or more conditions are true, warranting performing of the corresponding commands.

In an aspect, the commands represent a set of actions that is performed in response to one or more corresponding conditions being true.

For example, upon a determination of an impending collision by a network node of an autonomous vehicle where the MCU (assigned to that network node) is unavailable at that critical time, the network node takes over by detecting the MCU unavailability and causing the one or more commands (e.g., actions) to be performed such as braking, steering out of the way, flashing the lights, and so forth. These actions are performed without the MCU since the MCU is unavailable. In this way, network function redundancy and overall safety can be achieved.

As another example, a window may be detected as being about to close on a hand at a time that the MCU is unavailable (the condition part) such that in an aspect, the MCU unavailability is detected by the network node, the intervening hand is detected by the network node between the top of the window and the frame to which the top of the window meets, and the window motor is stopped and reversed by the network node to prevent hand injury (the command part).

In an aspect, a condition is made to "correspond to" a command in being mapped to that command. Any type of mapping and/or associating may be used. In an aspect, a table is used where the one or more conditions map to one or more corresponding commands. In an aspect, a hash function is used to map one or more conditions to one or more commands. In an aspect, an associative memory is used, where the one or more conditions may represent indexes to the memory locations of the one or more corresponding commands.

Referring to FIG. 1, an example communication system 100 having an Electronic Controller Unit (MCU) 110 and a set of remote network nodes 101 is shown, in accordance with an example aspect. The set of remote network nodes 101 includes nodes 120, 130, and 140.

In the example of FIG. 1, the system 100 can be installed in, and correspond to, a vehicle 199. For example, the MCU 110 may be the main controller of the vehicle 199 and the set of remote network nodes 101 may correspond to vehicle systems such as steering, accelerating, braking, stability, audio (telephone, music, etc.), lighting, and so forth. Thus, the nodes 120, 130, 140 are remote from the MCU 110 and may be local to one or more vehicle or robot or other device subsystems. However, it is to be appreciated that aspects of the present disclosure are not limited to a vehicle and can be applied to any type of system that includes an MCU and remote network nodes such as a robotic system, a surveillance system, a facility access system, and so forth. For example, in the case of a robotic system, the remote network nodes 120, 130, 140 can represent motors for controlling movement and arms of robots. Moreover, aspects of the present disclosure may be readily applied to communication systems having one or more MCUs and a set of remote nodes, where the one or more MCUs are configured to control the set of remote nodes except when conditions occur as detected by and acted upon by the remote nodes in the set. For example, one MCU may pertain to the vehicle steering system, another MCU may pertain to vehicle stability, while yet another MCU may pertain to vehicle acceleration, and so on. In this case, the remote nodes that pertain to these MCUs may be configured to act autonomously upon detecting certain conditions including, for example, when a corresponding MCU is available to provide instructions in the face of a condition occurrence.

Figure 2:
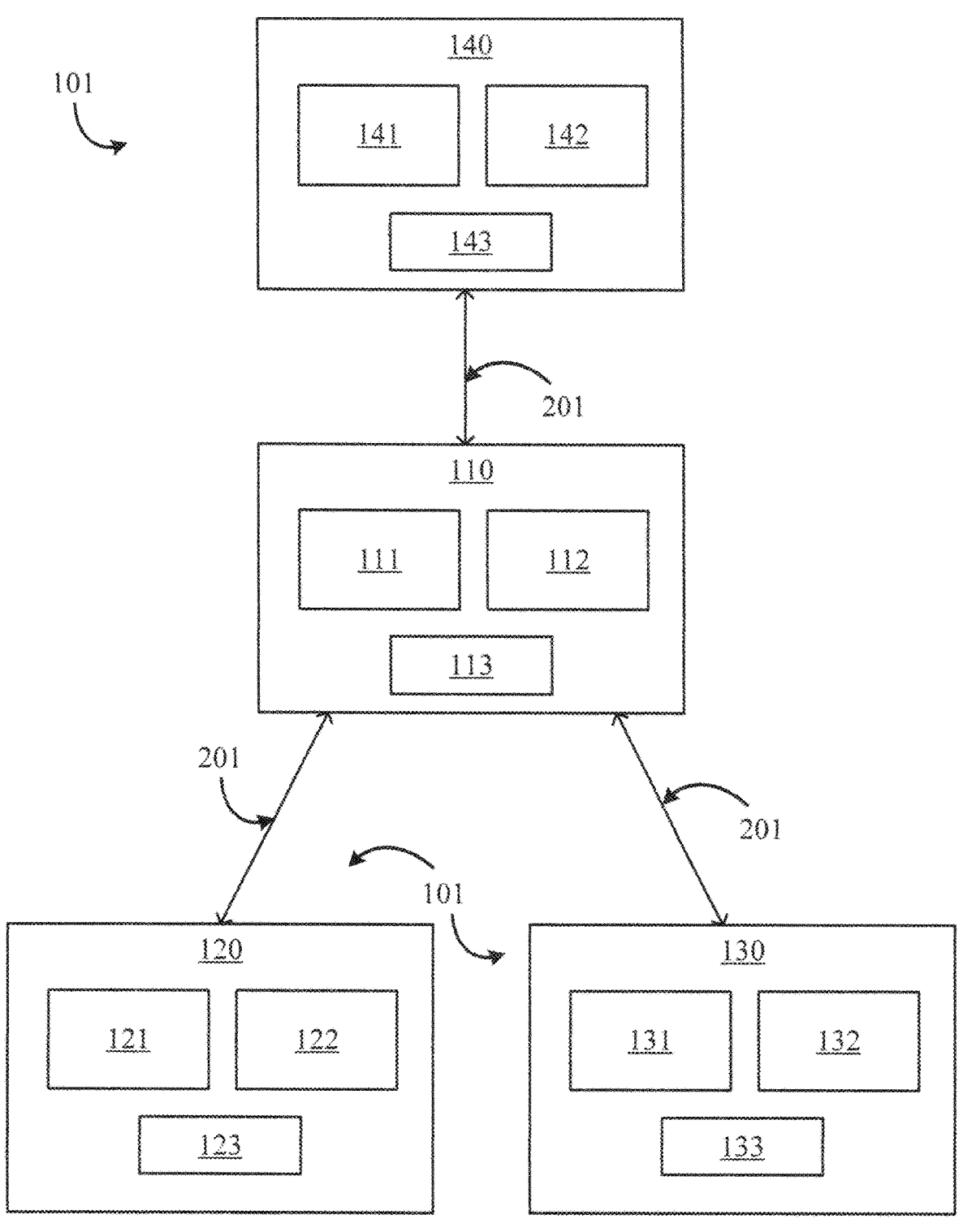
FIG. 2 is a block diagram of examples of the MCU and set of nodes of FIG. 1, in accordance with an example aspect.
Figure 3:
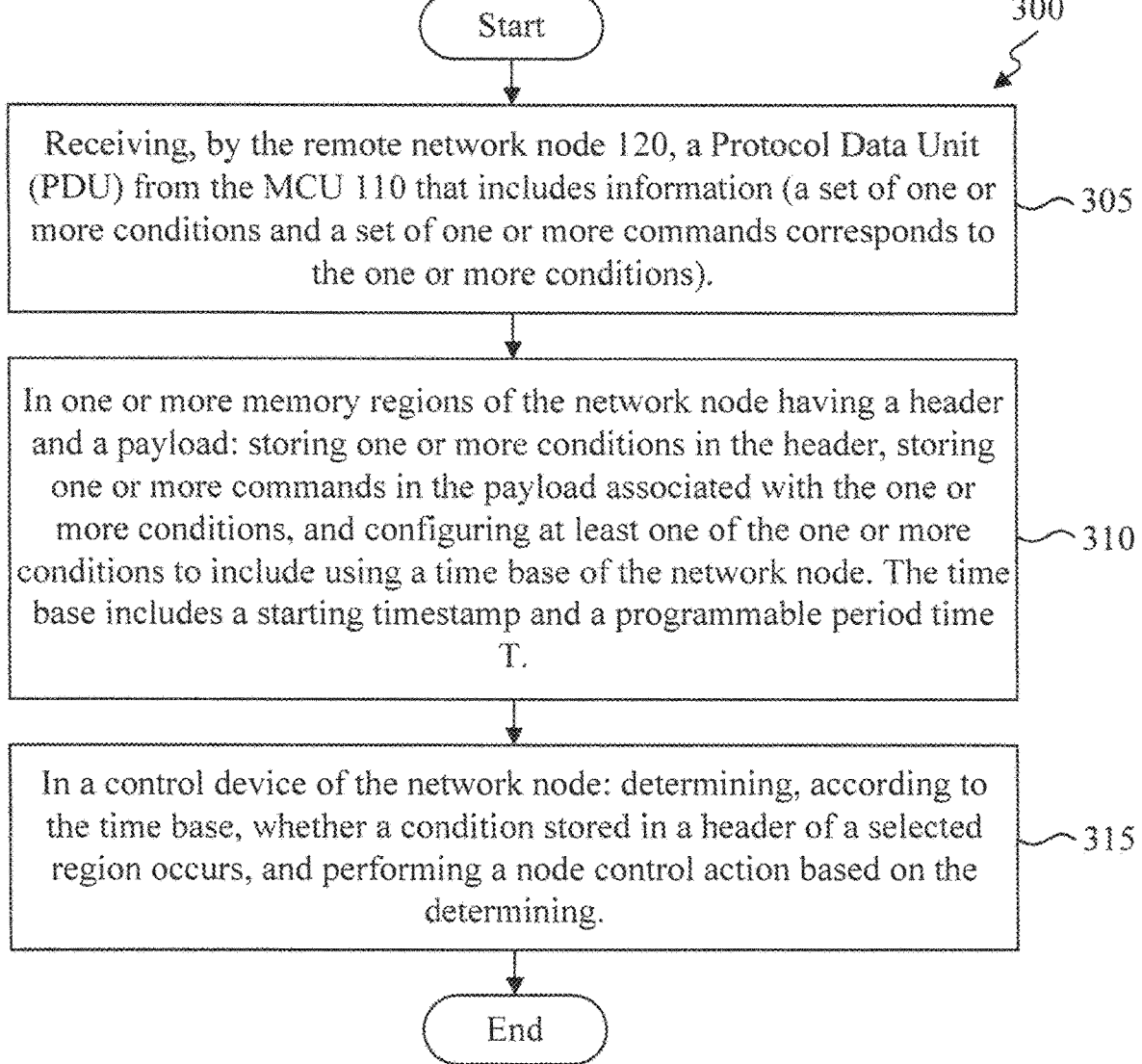
FIG. 3 is a flow diagram of an example method for using a network node without Master Control Unit intervention in a multi-node network, in accordance with an example aspect.
Figure 7:
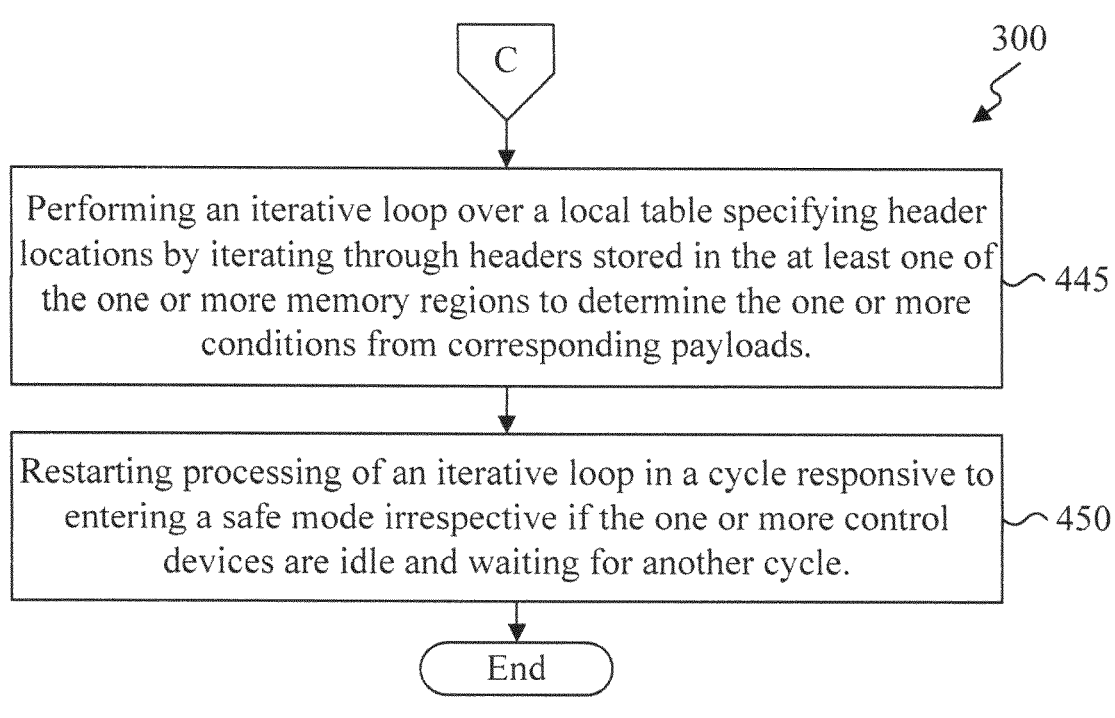

Referring to FIG. 2, examples of the MCU 110 and set of nodes 101 are shown, in accordance with an example aspect.

Each of the MCU 110 and/or the nodes 101 may include one or more memories 1X1 (i.e., MCU 110 includes one or memories 111, remote network node 120 includes one or more memories 121, remote network node 130 includes one or more memories 131, remote network node 140 includes one or more memories 141, and so forth), individually or in combination, having instructions. Each of the MCU 110 and/or the nodes 101 may include one or more processors 1Y2 (i.e., MCU 110 includes one or more processors 112, remote network node 120 includes one or more processors 122, remote network node 130 includes one or more processors 132, remote network node 140 includes one or more processors 142, and so forth, with Y being an integer equal to or greater than 1) each coupled to at least one of the one or more memories 1X1 and configurable to execute the instructions. In various aspects, MCU 110 is superior to nodes 120, 130, 140 in hierarchy, and provides instructions, for the one or more processors 112, 122, 132, and 142. In various aspects, only MCU 110 includes the one or more memories and one or more processors, and provides signals for controlling the remote network nodes 120, 130, and 140.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

In various aspects, MCU 110 and/or remote network nodes 101 may include one or more peripherical devices 1X3 (i.e., MCU 110 includes peripheral device(s) 113, remote network node 120 includes peripheral device(s) 123, remote network node 130 includes peripheral device(s) 133, remote network node 140 includes peripheral device(s) 143, and so forth). For example, the MCU 110 may include one or more input devices as peripheral device(s) 113. As a further example, the remote network nodes 101 may include one or more motors, lights, speakers, displays, and so forth as peripheral device(s) 123, 133, and/or 143.

MCU 110 and remote network nodes 120, 130, and 140 are connected by one or more wires 201. For example, but not limited hereto, any of the following cable types may be used: coaxial; twisted pair; and fiber-optic cabling. In current Local Area Networks, the twisted pair cabling is the most popular type of cabling, but the fiber-optic cabling usage is increasing, especially in high performance networks.

A description will now be given regarding various aspects of the present disclosure with respect to example communications between the MCU 110 and one of the remote network nodes 101, such as but not limited to remote network node 120.

In an aspect, communications between the MCU 110 and remote network node 120 may include information such as, but not limited to, one or more conditions and one or more commands corresponding to the conditions.

In an aspect, the one or more conditions may be sent in a header portion of a PDU packet and one or more commands corresponding to the one or more conditions may be sent in a payload portion of the PDU packet. In another aspect, the one or more conditions may be sent in the same one of either the header or payload.

In an aspect, the same PDU packet can include both the one or more conditions and the one or more commands corresponding to those one or more conditions. In another aspect, different (e.g., consecutive) PDU packets can include the one or more conditions and the one or more commands corresponding to those one or more conditions. For example, a first PDU packet includes one or more conditions and the next PDU packet includes the one or more commands corresponding to those one or more conditions.

In an aspect, one or more conditions form a set of conditions, and one or more commands form a set of commands. In an aspect, a set of conditions and/or a set of conditions is used for each subsystem being monitored (e.g., measured against the conditions). In another aspect, systems can be further partitioned with respect to having a set of conditions per partition, where a partition is used herein to refer to a partition of a subsystem. As example, in the case of a car being the representative system, then the subsystems can include steering, stability, braking, accelerating, lighting, power windows, power locks, and so forth. As another example, in the case of a robot being the representative system, then the subsystems would be steering, braking, accelerating, arm related subsystems enabling selecting, grasping, and releasing objects, for example, and so forth.

In an aspect, each set of conditions has a corresponding set of commands. In an aspect, other mappings may be used so as to reuse either conditions and/or commands across multiple PDU units and potentially multiple subsystems and/or multiple partitions within a same subsystem or different sub-systems. For example, a same condition of a given maximum temperature may be applied to more than one subsystem and reused by going back to a single memory location (e.g., header location) having that condition or to multiple memory locations having that condition that each correspond to a different subsystem and/or partition.

In an aspect, an implementation involves storing, in each of one or more memory regions of the network node having a header and a payload: one or more conditions in the header, and one or more commands in the payload associated with the one or more conditions. In an aspect, each of the one or more memory regions is a series of contiguous memory locations.

In an aspect, the multi-node network may be an Ethernet to the Edge Bus ($E^2B$) network. In an aspect, the multi-node network may be a 10BASE-TIS network. Of course, the present disclosure applies to other network types.

In an aspect, finite state machines (FSMs or state machines in short) are used for efficiency sake. In an aspect, state machines are used by remote network node 120 to determine whether the one or more conditions in the header of the region occur. A transmitter or transceiver of the remote network node 120 transmits the commands in the payload of the region to a subsystem capable of action/response, responsive to a signal from the state machine indicating that it has determined that the one or more conditions in the header of the region occur. If the state machine determined that the one or more conditions in the header of the region do not occur, then the state machine advances to a next region and determines whether one or more conditions in a header of the next region occur.

In another aspect, finite state transducers are used in the same way as FSMs, but with their output function being the trigger for sending the commands (or advancing to the next header) versus having to monitor a current state to determine when the FSM transitions to determine when to trigger the sending of commands (or advancing to the next header) upon determining by the network node the unavailability of the MCU 110.

In yet another aspect, microcontrollers are used by remote network node 120 to determine whether the one or more conditions in the header of the region occur. A transmitter or transceiver of the remote network node 120 transmits the commands in the payload of the region to a subsystem capable of action/response, responsive to a signal from a microcontroller indicating that it has determined that the one or more conditions in the header of the region occur. If the microcontroller determined that the one or more conditions in the header of the region do not occur, then the microcontroller advances to a next region and determines whether one or more conditions in a header of the next region occur.

A control device as used herein refers to any of the preceding types of devices including processor(s) and memory(s), microcontroller(s), state machine(s), logic device(s) (programmable logic array, etc.), and so forth.

Referring to FIGS. 3-7, an example method 300 is shown for operating a network node in a multi-node network having one or more Master Control Units (MCUs) configured to control network nodes of the multi-node network when the one or more MCUs are available. The actions of the method 300 may be performed, for example, by one or any combination of the respective one or more processors 112 and 122, e.g., based on stored instructions in one or any combination of the respective one or more memories 111 and 121 (and/or microcontrollers and/or state machines or so forth). It should be understood that while method 300 is described with respect to communications between MCU 110 and remote network node 120, method 300 may be applied to MCU 110 and any of the other nodes 130 and/or 140 and/or to other MCUs (not shown).

At block 305, the method 300 includes receiving, by the remote network node 120, a Protocol Data Unit (PDU) from the MCU 110 that includes information (a set of one or more conditions and a set of one or more commands corresponds to the one or more conditions). While a single set of conditions and a single set of commands are described for the sake of illustration, any number of sets can be used depending upon the implementation and the number if sensors to respond to as well as the number of corresponding actions to be performed responsive to the sensor outputs. Any type of conditions and corresponding commands may be used. For example, sensor conditions (temp<X degrees Fahrenheit, speed<1200 rpm, impending collision, window closing on hand, etc.) and so forth may be used. Moreover, while a single MCU 110 is described for the sake of illustration and conciseness, the aspects of the present disclosure can be readily applied to networks that include more than one MCU. For example, each subsystem/subnetwork may include a respective MCU and respective set of subnodes. All of the subsets of nodes for all of the subsystems/subnetworks may correspond to a set of nodes of the system/network.

At block 310, the method 300 includes, in one or more memory regions of the network node having a header and a payload: storing one or more conditions in the header, storing one or more commands in the payload associated with the one or more conditions, and configuring at least one of the one or more conditions to include using a time base of the network node. The time base includes a starting timestamp and a programmable period time T.

At block 315, the method 300 includes, in a control device of the network node: determining, according to the time base, whether a condition stored in a header of a selected region occurs, and performing a node control action based on the determining.

Referring to FIGS. 4-6, further steps of method 300 for using a network node without Master Control Unit (MCU) intervention are shown, in accordance with an example aspect.

At block 405, the method 300 includes establishing the one or more conditions and the one or more commands by the one or more MCUs.

In an aspect, block 405 may include one or more of blocks 405A and 405B.

At block 405A, the method 300 includes configuring at least one of the one or more conditions to comprise an indication of (i) a malfunction or (ii) disconnection of at least one MCU of the one or more MCUs, (iii) a node being in a safe mode, (iv) a processing time having been reached, (v) a pin of the network node being asserted or (vi) not asserted, (vii) an internal signal being asserted or (viii) not asserted, (ix) an execution counter associated with the region being above an execution threshold, or (x) a sensor input being above an input threshold.

At block 405B, the method 300 includes configuring the network node to perform the node control action independently from the one or more MCUs responsive to an occurrence of the condition.

At block 410, the method 300 includes executing a command stored in a payload of the selected region and the node control action, upon determining that the condition stored in the header of the selected region occurs.

In an aspect, block 410 may include one or more of blocks 410A through 410C.

At block 410A, the method 300 includes executing the command by at least one of: transmitting the commands in the payload of the selected region; writing to memory locations of the network node via the multi-node network; executing at least one of the one or more commands at a peripheral of the node; or executing at least one of the one or more commands at another node of the network.

In an aspect, block 410A may include block 410A1.

At block 410A1, the method 300 includes configuring the one or more commands to include reversing at least one of a motor and illuminating a warning light emitting diode.

At block 410B, the method 300 includes determining whether the one or more conditions in the header of the region occur by determining whether a processing time has been reached and, if so, then executing the command periodically by erasing a timestamp of the processing time.

In an aspect, block 410B may include block 410B1.

At block 410B1, the method 300 includes configuring at least another one of the one or more conditions to include determining whether the timestamp of the processing time exists at a next processing time and, if not, then the one or more commands include skipping to a next region at the next processing time to permit a device to write to memory location corresponding to the timestamp of the next processing time for later evaluation at a subsequent processing time after the next processing time.

At block 410C, the method 300 includes executing the command periodically according to the time base, and wherein determining whether the one or more conditions in the header of the region occur includes determining whether an execution counter associated with the region has exceeded an execution threshold within a present period time and, if so, then stopping the periodic execution of the command.

At block 415, the method 300 includes determining whether a plurality of conditions stored in the header of the selected region occur.

At block 420, the method 300 includes determining whether all of the conditions stored in the header of the selected region occur.

At block 425, the method 300 includes measuring the period time using a generic precision time protocol (gPTP) or a crystal oscillator (XTAL) or a clock synthesizer.

At block 430, the method 300 includes, in the control device, identifying the selected region responsive to a triggered state of at least one of the one or more conditions.

At block 435, the method 300 includes, as the node control action, upon determining that the condition stored in the header of the selected region does not occur, advancing to a region in a next header, or to a header in a next region, and determining whether a condition stored therein occurs.

At block 440, the method 300 includes configuring the control device to execute a loop through multiple regions once every programmable period time T. The multiple regions include a header and one or more commands.

At block 445, the method 300 includes performing an iterative loop over a local table specifying header locations by iterating through headers stored in the at least one of the one or more memory regions to determine the one or more conditions from corresponding payloads.

At block 450, the method 300 includes restarting processing of an iterative loop in a cycle responsive to entering a safe mode irrespective if the one or more control devices are idle and waiting for another cycle.

Figure 8:
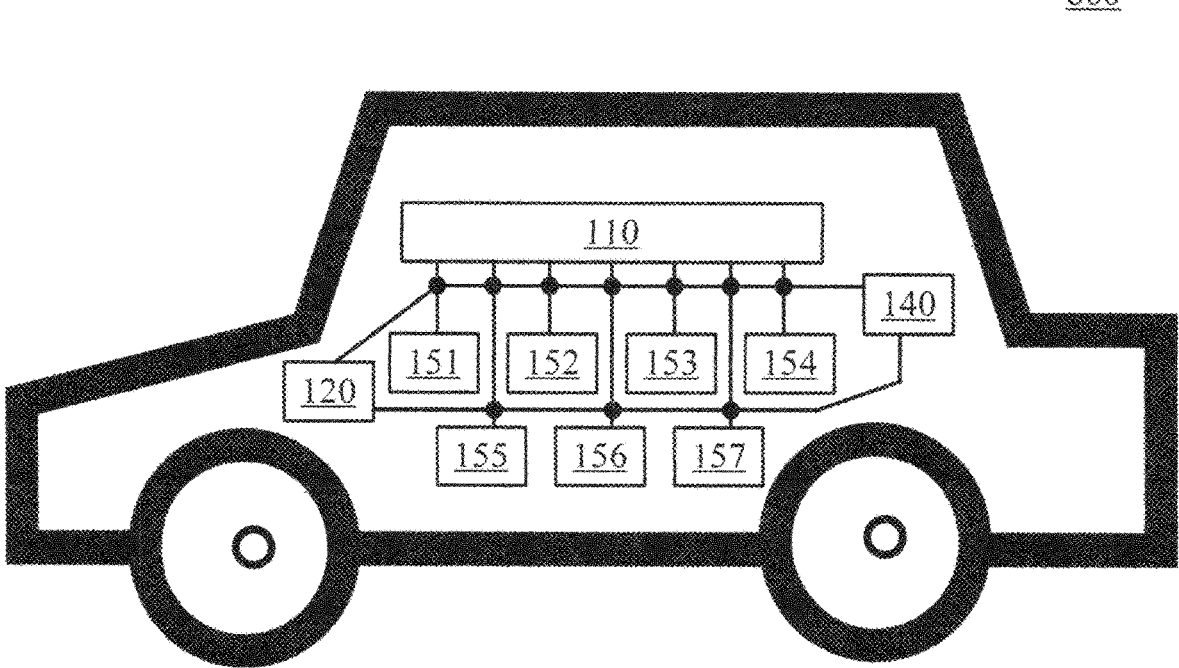
FIG. 8 is a block diagram of an exemplary subset of subsystems of an autonomous vehicle, in accordance with an example aspect.

Referring to FIG. 8, an exemplary subset of subsystems of an autonomous vehicle (car, robot, etc.) 700 is shown, in accordance with an example aspect.

The subset includes one or more MCUs (hereinafter "MCU") 110, network node 120, subsystem-1 151, subsystem-2 152, subsystem-3 153, subsystem-4 154, subsystem-5 155, subsystem-6 156, and subsystem 157. Other than network node 140, other network nodes are not shown but each subsystem may have its own node in an aspect. In such an aspect, inter-network-node communication may occur in order to facilitate performance of a particular set of commands. For the sake of simplicity, a bus is shown as one variant of autonomous vehicle 700. In other aspects, direct wires from one entity to another may be used as shown in FIG. 2. It is to be appreciated that in some aspects, the subsystems may be connected in a different manner than the remote network node, and in other aspects the subsystems may be connected in a same manner as the remote network node.

In an aspect, the following applies:

Subsystem-1 151: stability subsystem;

Subsystem-2 152: braking subsystem;

Subsystem-3 153: accelerating subsystem;

Subsystem-4 154: steering subsystem;

Subsystem-5 155: power windows subsystem;

Subsystem-6 156: power locks subsystem; and

Subsystem-7 157: lights subsystem.

In an aspect, a set of fine state machines (FSMs) and/or state machine transducers (SMTs) of the network node 120 determine the unavailability of the MCU 110 and act accordingly to determine whether certain conditions exist (e.g., an impending collision with an object (other vehicle, pedestrian or object), unavailability of the MCU 110) and to cause the appropriate commands to be sent to the appropriate subsystems when the conditions are determined to exist and/or otherwise occur.

In aspect, each subsystem has a corresponding set of FSMs and/or SMTs assigned to it within the network node 120. For example, a first set of FSMs and/or SMTs may correspond to the stability subsystem and its operating parameters, while a second set of FSMs and/or SMTs may correspond to the braking subsystem and its operating parameters, and so on. In another aspect, subsystems share sets of FSMs or state machine transducers. For example, a first set of FSMs and/or SMTs may correspond to a first set of common operating parameters such as, for example, temperature, across multiple subsystems while a second set of FSMs and/or SMTs may correspond to a second set of common operating parameters such as maximum speed, across multiple subsystems, and so on.

In an aspect, a deterministic FSM may be a quintuple ($\Sigma$, S, $s_0$, $\delta$, F), where:

$\Sigma$ is the input alphabet (a finite non-empty set of symbols);

S is a finite non-empty set of states;

$s_0$ is an initial state, an element of S;

$\delta$ is the state-transition function: $\delta$: S×$\Sigma$→S (in a nondeterministic finite automation it would be $\delta$: S×$\Sigma$→P(S), i.e. $\delta$ would return a set of states); and F is the set of final states, a (possible empty) subset of S.

In an aspect, a FST may be a sextuple ($\Sigma$, $\Gamma$, S, $s_0$, $\delta$, $\omega$), where:

$\Sigma$ is the input alphabet (a finite non-empty set of symbols);

$\Gamma$ is the output alphabet (a finite non-empty set of symbols);

S is a finite non-empty set of states;

$s_0$ is the initial state, an element of S;

$\delta$ is the state-transition function: $\delta$: S×$\Sigma$→S; and $\omega$ is the output function.

In an aspect, a state of an FSM and/or SMT may represent a condition.

In an aspect, a SMT may be a Moore machine or a Mealy Machine. In the case of a Mealy machine, the condition evaluation may be tied to command execution. For example, the command of opening a window may be tied in the Mealy machine to the if condition of whether a hand is present in between the top of the window and the window frame (input action) and the converse condition of whether a hand is absent (converse input action) to implement opposing actions of opening or closing the window depending on the state representative of the condition (occur/not occur).

In an aspect, output function $\omega$ may be used to trigger transmission of the commands from the remote network node 120 to the appropriate subsystem 137.

Figure 9:
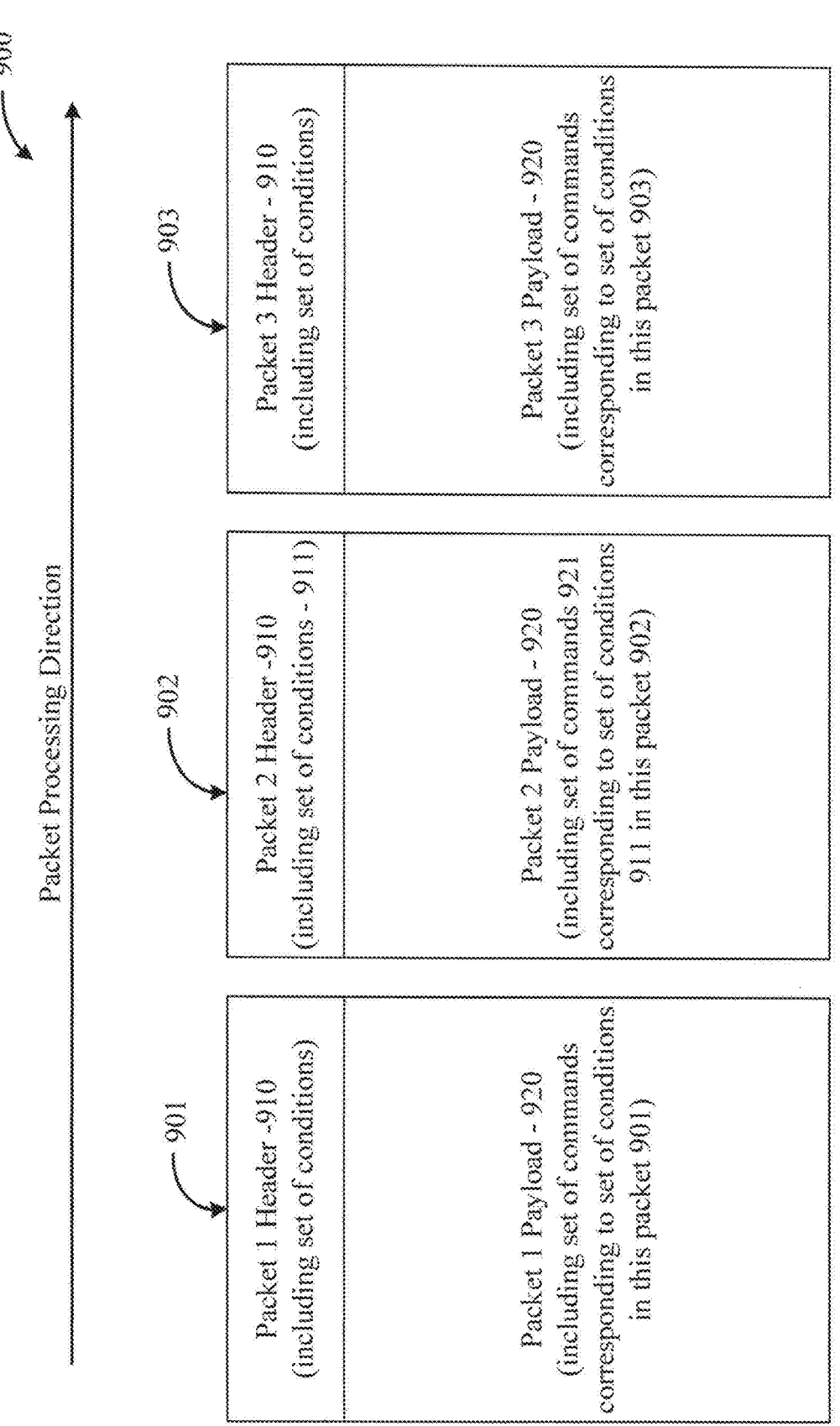
FIG. 9 is a block diagram of an exemplary packet configuration, in accordance with an example aspect.

Referring to FIG. 9, an exemplary packet configuration 900 is shown, in accordance with an example aspect.

Three packets 901, 902, and 903 are shown. The following description will be given for the middle packet 902, with that description also applying to packets 901 and 903.

The packet configuration 900 for packet 902 includes a header portion 910 and a payload portion 920. While both portions 910 and 920 may include other information, for the purposes of the present disclosure, the header portion 910 includes one or more conditions 911, and the payload portion 920 includes one or more commands 921 corresponding to the one or more conditions 911. Thus, in the case of FIG. 9, the same packet (any of packets 901, 902, or 903) is used for the conditions and the commands that correspond to those conditions.

In an aspect, processing packets may be performed using an iterative loop that reads the conditions in a given packet and then reads the commands for those conditions in the same packet. For example, a set of packets may be sent from the MCU 110 to the network node 120 during "normal" times for use during non-normal time evaluations such as, but not limited to, when the MCU 110 is unavailable. For certain conditions, repetitive looping may be used to frequently check for the certain conditions according to a schedule. To that end, subroutines may be used.

Figure 10:
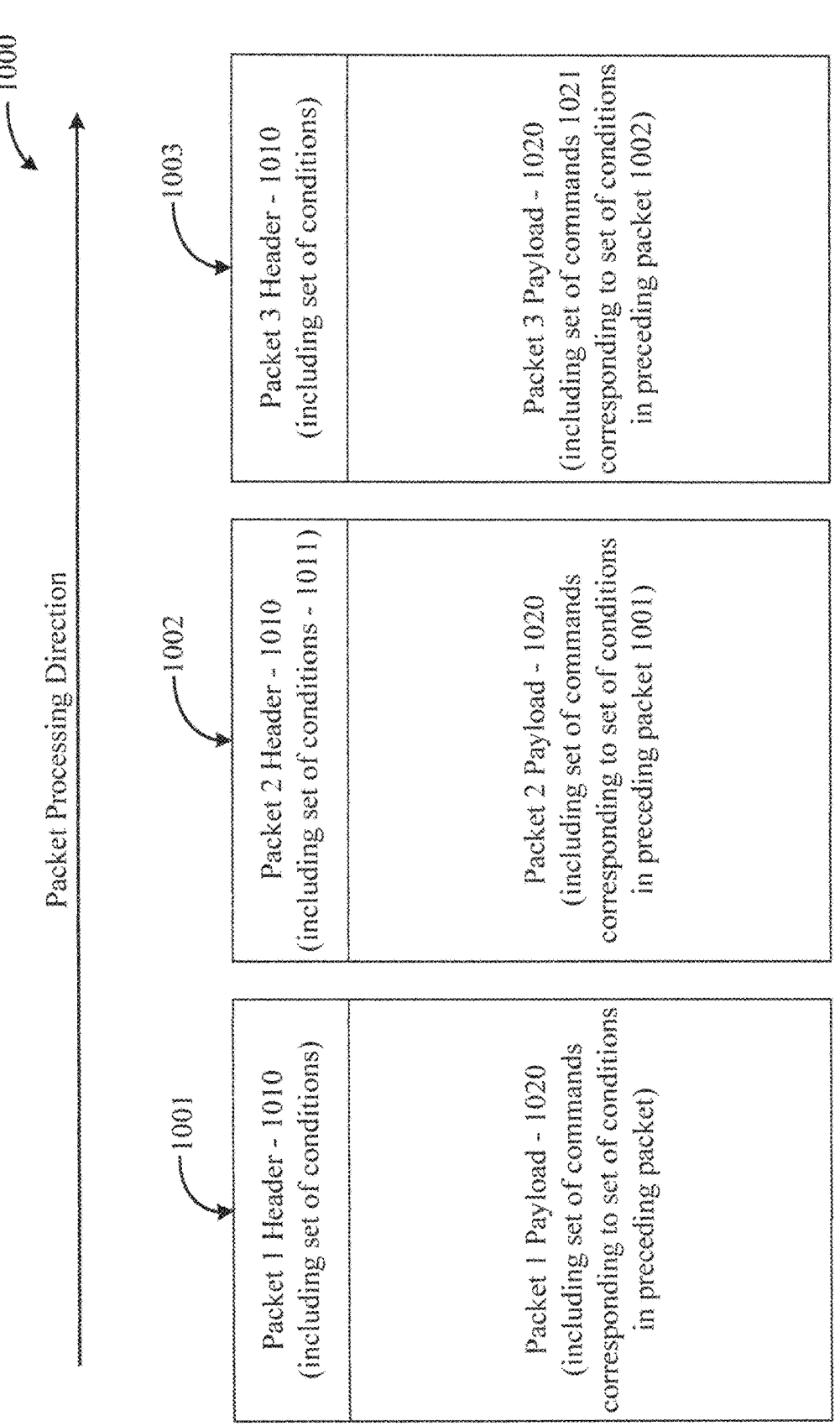
FIG. 10 is a block diagram of another exemplary packet configuration, in accordance with an example aspect.

Referring to FIG. 10, another exemplary packet configuration 1000 is shown, in accordance with an example aspect.

Three packets 1001, 1002, and 1003 are shown. The following description will be given for the middle packet 1002, with that description also applying to packets 1001 and 1003.

The packet configuration 1000 for packet 1002 includes a header portion 1010 and a payload portion 1020. While both portions 1010 and 1020 may include other information, for the purposes of the present disclosure, the header portion 1010 includes one or more (set) conditions 1011, and the payload portion 1020 includes one or more (set) commands 1021 corresponding to one or more conditions in the preceding header of packet 1001. In the case of FIG. 10, two consecutive packets are used for the conditions (header 1010 of packet 1002) and the commands (payload 1020 of following packet 1003) that correspond to the conditions.

In an aspect, processing packets may be performed using an iterative loop that reads the conditions in a given packet and then reads the commands for those conditions in a following packet. For certain conditions, repetitive looping may be used to frequently check for the certain conditions. To that end, subroutines may be used.

A description will now be given regarding memory usage.

In an aspect, the memory is divided into regions or microprograms. The regions may be automatically enabled and/or manually enabled for condition checking and corresponding commands transmittal by the remote network node.

Start and end positions can be fully programmed as well as the triggering conditions.

When a microprogram passes the triggering conditions, the microprogram is executed and transmitted to the TIS network, the OASPI bus or both.

Time Base

The block has a time base that can be defined by the user from any time period. For example, 1 ns to 18 hours. The time base can be locked to a time synchronized timestamp so that multiple network devices can share the same time base.

For all the time base to have not just the same period, but to also start at the same time, the enable of the time base is conditioned by a user programmable time synchronized timestamp.

If the user timestamp is in the future, the module will be disabled. As a safety feature, if the programmable synchronized timestamp is in the future at the activation time, the module will not get activated until the ECU resolves the condition.

As soon as the user timestamp goes into the present, the periodic functionality will be executed once and then, once more every time the time base time occurs.

Region Functionality

Each region can be configured to be automatic, or manually triggered.

If the region is automatic, it will be playback at the start of each time base, in order.

If the region is manual, it can only be executed after all the automatic regions but only if an extra condition is also meet, and only one time.

The trigger can be launched via the register map.

Or the trigger can be a signal from the General Purpose Input/Output (GPIO).

Other conditions might also be present including, but not limited to, the execution of a different command;

an internal condition (similar to GPIO conditions but the internal condition can come from internal flags); and the unavailability of one or more MCUs.

TIS Playback Functionality

A region can be marked as a TIS region which means that rather than be sent to the interface it is connected, it will be transmitted to the LCE TIS encoder.

This is in combination of the automatic/manual mode or any other condition. So, a message can be transmitted to the TIS bus periodically, or only when certain conditions are meet.

Safety Mode Functionality

In an aspect, a region can be marked as a functional, safe or dont_care region which means that rather than be executed always, the region can be executed only when in functional mode, when in safe mode, or always.

This is in combination of the automatic/manual mode or any other condition, like T1s or gPTP conditions.

gPTP Launch Time

A region can also a defined gPTP (time synchronized) timestamp at the first eight bytes of the region or any other location depending upon the implementation.

The region will only be executed if all the conditions are met, plus the configured gPTP (time synchronized) timestamp is in the past.

After the region has been executed, the configured timestamp is erased, effectively disabling the region until it is reprogrammed.

These and other variations of the present disclosure are readily contemplated by one of ordinary skill in the art given the teachings of the present disclosure provided herein.

Aspects of the present disclosure include one or any combination of the following clauses.

Clause 1. A method of operating a network node in a multi-node network having one or more Master Control Units (MCUs) configured to control network nodes of the multi-node network when the one or more MCUs are available, the method comprising: in one or more memory regions of the network node having a header and a payload: storing one or more conditions in the header, storing one or more commands in the payload associated with the one or more conditions, and configuring at least one of the one or more conditions to comprise using a time base of the network node, the time base including a starting timestamp and a programmable period time T; and in a control device of the network node: determining, according to the time base, whether a condition stored in a header of a selected region occurs, and performing a node control action based on the determining.

Clause 2. The method in accordance with clause 1, wherein the storing comprises establishing the one or more conditions and the one or more commands by the one or more MCUs.

Clause 3. The method in accordance with any preceding clauses, wherein the establishing the one or more conditions includes configuring at least one of the one or more conditions to comprise an indication of (i) a malfunction or (ii) disconnection of at least one MCU of the one or more MCUs, (iii) a node being in a safe mode, (iv) a processing time having been reached, (v) a pin of the network node being asserted or (vi) not asserted, (vii) an internal signal being asserted or (viii) not asserted, (ix) an execution counter associated with the region being above an execution threshold, or (x) a sensor input being above an input threshold.

Clause 4. The method in accordance with clause 2, further comprising: configuring the network node to perform the node control action independently from the one or more MCUs responsive to an occurrence of the condition.

Clause 5. The method in accordance with any preceding clauses, wherein the node control action, upon determining that the condition stored in the header of the selected region occurs, includes executing a command stored in a payload of the selected region.

Clause 6. The method in accordance with any preceding clauses, wherein executing the command includes at least one of: transmitting the commands in the payload of the selected region; writing to memory locations of the network node via the multi-node network; executing at least one of the one or more commands at a peripheral of the node; or executing at least one of the one or more commands at another node of the network.

Clause 7. The method in accordance with any preceding clauses, further comprising configuring the one or more commands to comprise reversing at least one of a motor and illuminating a warning light emitting diode.

Clause 8. The method in accordance with any preceding clauses, wherein the determining includes determining whether a plurality of conditions stored in the header of the selected region occur.

Clause 9. The method in accordance with any preceding clauses, wherein the determining includes determining whether all of the conditions stored in the header of the selected region occur.

Clause 10. The method in accordance with any preceding clauses, wherein the period time is measured using a generic precision time protocol (gPTP) or a crystal oscillator (XTAL) or a clock synthesizer.

Clause 11. The method in accordance with any preceding clauses, wherein the determining whether the one or more conditions in the header of the region occur comprise determining whether a processing time has been reached and, if so, then the method further comprises executing the command periodically by erasing a timestamp of the processing time.

Clause 12. The method in accordance with any preceding clauses, further comprising configuring at least another one of the one or more conditions to comprise determining whether the timestamp of the processing time exists at a next processing time and, if not, then the one or more commands comprise skipping to a next region at the next processing time to permit a device to write to memory location corresponding to the timestamp of the next processing time for later evaluation at a subsequent processing time after the next processing time.

Clause 13. The method in accordance with any preceding clauses, wherein the method further comprises executing the command periodically according to the time base, and wherein determining whether the one or more conditions in the header of the region occur comprise determining whether an execution counter associated with the region has exceeded an execution threshold within a present period time and, if so, then the method further comprises stopping the periodic execution of the command.

Clause 14. The method in accordance with any preceding clauses, further comprising, in the control device, identifying the selected region responsive to a triggered state of at least one of the one or more conditions.

Clause 15. The method in accordance with any preceding clauses, wherein the node control action, upon determining that the condition stored in the header of the selected region does not occur, includes advancing to a region in a next header, or to a header in a next region, and determining whether a condition stored therein occurs.

Clause 16. The method in accordance with any preceding clauses, wherein the control device is configured to execute a loop through multiple regions once every programmable period time T, wherein the multiple regions comprise a header and one or more commands.

Clause 17. The method in accordance with any preceding clauses, further comprising performing an iterative loop over a local table specifying header locations by iterating through headers stored in the at least one of the one or more memory regions to determine the one or more conditions from corresponding payloads.

Clause 18. The method in accordance with any preceding clauses, further comprising restarting processing of an iterative loop in a cycle responsive to entering a safe mode irrespective if the one or more control devices are idle and waiting for another cycle.

Clause 19. A network node in a multi-node network having one or more Master Control Units (MCUs) configured to control network nodes of the multi-node network when the one or more MCUs are available, the network node comprising: one or more memories, individually or in combination, configured to store instructions, headers and payloads in at least one of one or more memory regions; and one or more control devices, each coupled to at least one of the one or more memories, configured to execute the instructions to, in the one or more memory regions of the network node having a header and a payload: store one or more conditions in the header, store one or more commands in the payload associated with the one or more conditions, and configure at least one of the one or more conditions to comprise using a time base of the network node, the time base including a starting timestamp and a programmable period time T, wherein the one or more control devices are further configured to: determine, according to the time base, whether a condition stored in a header of a selected region occurs, and perform a node control action based on the determining.

Clause 20. A computer program product for operating a network node in a multi-node network having one or more Master Control Units (MCUs) configured to control network nodes of the multi-node network when the one or more MCUs are available, the computer program product being configured to simulate various functions of a remote network node, and including one or more non-transitory computer-readable media, having instructions stored thereon that when executed by one or more processors cause the one or more processors, individually or in combination, to perform a method including the steps of: in one or more memory regions of the network node having a header and a payload: storing one or more conditions in the header, storing one or more commands in the payload associated with the one or more conditions, and configuring at least one of the one or more conditions to comprise using a time base of the network node, the time base including a starting timestamp and a programmable period time T; and in a control device of the network node: determining, according to the time base, whether a condition stored in a header of a selected region occurs, and performing a node control action based on the determining.

Aspects of the present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages.

Aspects of the present disclosure are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In various aspects, a computer-implemented method and a computer program product configured to manage a remote network node of a system in an absence of MCU intervention are provided. The computer program product includes one or more non-transitory computer-readable media, having instructions stored thereon that when executed by one or more processors cause the one or more processors, individually or in combination, to perform a method as described herein.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that all of the specifications, dimensions, and relationships outlined herein (e.g., the number of elements, operations, steps, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example aspects have been described with reference to particular component arrangements. Various modifications and changes may be made to such aspects without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system may be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and may accommodate a large number of components, as well as more complicated/sophisticated arrangements and configurations. Accordingly, the examples provided should not limit the scope or inhibit the broad teachings of the electrical circuits as potentially applied to myriad other architectures.

It should also be noted that in this Specification, references to various features (e.g., elements, structures, modules, components, steps, operations, characteristics, etc.) included in "one aspect", "example aspect", "an aspect", "another aspect", "some aspects", "various aspects", "other aspects", "alternative aspect", and the like are intended to mean that any such features are included in one or more aspects of the present disclosure, but may or may not necessarily be combined in the same aspects.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be noted that the functions related to circuit architectures illustrate only some of the possible circuit architecture functions that may be executed by, or within, systems illustrated in the FIGURES. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by aspects described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Note that all optional features of the device and system described above may also be implemented with respect to the method or process described herein and specifics in the examples may be used anywhere in one or more aspects.

The "means for" in these instances (above) may include (but is not limited to) using any suitable component discussed herein, along with any suitable software, circuitry, hub, computer code, logic, algorithms, hardware, controller, interface, link, bus, communication pathway, etc.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and may accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, aspects described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

The invention claimed is:

1. A method of operating a network node in a multi-node network having one or more Master Control Units (MCUs) configured to control network nodes of the multi-node network when the one or more MCUs are available, the method comprising:

in one or more memory regions of the network node having a header and a payload:
storing one or more conditions in the header,
storing one or more commands in the payload associated with the one or more conditions, and
configuring at least one of the one or more conditions to comprise using a time base of the network node, the time base including a starting timestamp and a programmable period of time T; and in a control device of the network node:
determining, according to the time base, whether a condition stored in a header of a selected region occurs, and
performing a node control action based on whether the condition is determined to have occurred.

2. The method in accordance with claim 1, wherein storing the one or more conditions and the one or more commands comprises establishing the one or more conditions and the one or more commands by the one or more MCUs.

3. The method in accordance with claim 2, wherein establishing the one or more conditions includes configuring at least one of the one or more conditions to comprise an indication of (i) a malfunction or (ii) disconnection of at least one MCU of the one or more MCUs, (iii) a node being in a safe mode, (iv) a processing time having been reached, (v) a pin of the network node being asserted or (vi) not asserted, (vii) an internal signal being asserted or (viii) not asserted, (ix) an execution counter associated with the selected region being above an execution threshold, or (x) a sensor input being above an input threshold.

4. The method in accordance with claim 2, further comprising:

configuring the network node to perform the node control action independently from the one or more MCUs responsive to an occurrence of the condition.

5. The method in accordance with claim 1, wherein the node control action, upon determining that the condition stored in the header of the selected region occurs, includes executing a command stored in a payload of the selected region.

6. The method in accordance with claim 5, wherein executing the command includes at least one of:

transmitting the one or more commands in the payload of the selected region;

21

22 writing to memory locations of the network node via the multi-node network;

executing at least one of the one or more commands at a peripheral of the network node; or executing at least one of the one or more commands at another node of the multi-node network.

7. The method in accordance with claim 6, further comprising configuring the one or more commands to comprise reversing at least one of a motor and illuminating a warning light emitting diode.

8. The method in accordance with claim 5, wherein determining whether the one or more conditions in the header of the selected region occur comprise determining whether a processing time has been reached and, if so, then the method further comprises executing the command periodically by erasing a timestamp of the processing time.

9. The method in accordance with claim 8, further comprising configuring at least another one of the one or more conditions to comprise determining whether the timestamp of the processing time exists at a next processing time and, if not, then the one or more commands comprise skipping to a next region at the next processing time to permit a device to write to memory location corresponding to the timestamp of the next processing time for later evaluation at a subsequent processing time after the next processing time.

10. The method in accordance with claim 5, wherein the method further comprises executing the command periodically according to the time base, and wherein determining whether the one or more conditions in the header of the selected region occur comprise determining whether an execution counter associated with the selected region has exceeded an execution threshold within a present period of time and, if so, then the method further comprises stopping periodic execution of the command.

11. The method in accordance with claim 1, wherein determining whether the one or more conditions occur comprises determining whether a plurality of conditions stored in the header of the selected region occur.

12. The method in accordance with claim 1, wherein determining whether the one or more conditions in the header of the selected region occur includes determining whether all of the one or more conditions stored in the header of the selected region occur.

13. The method in accordance with claim 1, wherein the programmable period of time T is measured using a generic precision time protocol (gPTP) or a crystal oscillator (XTAL) or a clock synthesizer.

14. The method in accordance with claim 1, further comprising, in the control device, identifying the selected region responsive to a triggered state of at least one of the one or more conditions.

15. The method in accordance with claim 1, wherein the node control action, upon determining that the condition stored in the header of the selected region does not occur, includes advancing to a region in a next header, or to a header in a next region, and determining whether a condition stored therein occurs.

16. The method in accordance with claim 15, wherein the control device is configured to execute a loop through multiple regions once every programmable period of time T, wherein the multiple regions comprise a header and one or more commands.

17. The method in accordance with claim 1, further comprising performing an iterative loop over a local table specifying header locations by iterating through headers stored in at least one of the one or more memory regions to determine the one or more conditions from corresponding payloads.

18. The method in accordance with claim 16, further comprising restarting processing of an iterative loop in a cycle responsive to entering a safe mode irrespective if the control device is idle and waiting for another cycle.

19. A network node in a multi-node network having one or more Master Control Units (MCUs) configured to control network nodes of the multi-node network when the one or more MCUs are available, the network node comprising:

one or more memories, individually or in combination, configured to store instructions, headers and payloads in at least one of one or more memory regions; and one or more control devices, each coupled to at least one of the one or more memories, configured to execute the instructions to, in the one or more memory regions of the network node having a header and a payload:

store one or more conditions in the header, store one or more commands in the payload associated with the one or more conditions, and configure at least one of the one or more conditions to comprise using a time base of the network node, the time base including a starting timestamp and a programmable period of time T, wherein the one or more control devices are further configured to:

determine, according to the time base, whether a condition stored in a header of a selected region occurs, and perform a node control action based on whether the condition is determined to have occurred.

20. A computer program product for operating a network node in a multi-node network having one or more Master Control Units (MCUs) configured to control network nodes of the multi-node network when the one or more MCUs are available, the computer program product being configured to simulate various functions of a remote network node, and including one or more non-transitory computer-readable media, having instructions stored thereon that when executed by one or more processors cause the one or more processors, individually or in combination, to perform a method including:

in one or more memory regions of the network node having a header and a payload:

storing one or more conditions in the header, storing one or more commands in the payload associated with the one or more conditions, and configuring at least one of the one or more conditions to comprise using a time base of the network node, the time base including a starting timestamp and a programmable period of time T; and in a control device of the network node:

determining, according to the time base, whether a condition stored in a header of a selected region occurs, and performing a node control action based on whether the condition is determined to have occurred.

21. The method in accordance with claim 1, wherein at least one of the one or more conditions relate to the control device and at least one parameter of the control device.

* * * * *